(12) United States Patent
Akada et al.

(10) Patent No.: US 10,427,971 B2
(45) Date of Patent: Oct. 1, 2019

(54) ULTRAVIOLET-ABSORBING GLASS ARTICLE

(71) Applicant: AGC Inc., Chiyoda-ku (JP)

(72) Inventors: Shuichi Akada, Tokyo (JP); Soshi Watanabe, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/949,211

(22) Filed: Apr. 10, 2018

(65) Prior Publication Data

US 2018/0222788 A1     Aug. 9, 2018

Related U.S. Application Data

(63) Continuation of application No. PCT/JP2016/080216, filed on Oct. 12, 2016.

(30) Foreign Application Priority Data

Oct. 16, 2015 (JP) ................. 2015-204306

(51) Int. Cl.
  *C03C 3/087* (2006.01)
  *C03C 4/08* (2006.01)
  *B60J 1/08* (2006.01)
  *B60J 1/18* (2006.01)

(52) U.S. Cl.
  CPC .............. *C03C 3/087* (2013.01); *C03C 4/085* (2013.01); *B60J 1/08* (2013.01); *B60J 1/18* (2013.01); *C03C 2204/00* (2013.01)

(58) Field of Classification Search
  CPC .................................. C03C 3/087; C03C 4/085
  See application file for complete search history.

(56) References Cited

U.S. PATENT DOCUMENTS

| | | |
|---|---|---|
| 5,905,047 A | 5/1999 | Sasage et al. |
| 6,287,998 B1 | 9/2001 | Seto et al. |
| RE37,514 E | 1/2002 | Sasage et al. |
| 6,413,893 B1 | 7/2002 | Shelestak et al. |
| 2003/0083188 A1 | 5/2003 | Seto et al. |
| 2004/0186001 A1 | 9/2004 | Seto et al. |

FOREIGN PATENT DOCUMENTS

| | | |
|---|---|---|
| JP | 09-315835 | 12/1997 |
| JP | 2000-247679 | 9/2000 |
| JP | 2003-002683 | 1/2003 |
| JP | 2003-508338 | 3/2003 |

OTHER PUBLICATIONS

International Search Report dated Jan. 10, 2017 in PCT/JP2016/080216 filed Oct. 12, 2016 (with English Translation).
Written Opinion dated Jan. 10, 2017 in PCT/JP2016/080216 filed Oct. 12, 2016.

*Primary Examiner* — Elizabeth A. Bolden
(74) *Attorney, Agent, or Firm* — Oblon, McClelland, Maier & Neustadt, L.L.P.

(57) ABSTRACT

Disclosed is an ultraviolet-absorbing glass article comprising a glass matrix composition including, in mass % in terms of oxide contents, 66-75% $SiO_2$, 10-20% $Na_2O$, 5-15% CaO, 0-6% MgO, 0-5% $Al_2O_3$, 0-5% $K_2O$, at least 0.8% to less than 2.4% total iron content in terms of $Fe_2O_3$ (t-$Fe_2O_3$), 0-0.01% $Cr_2O_3$, 0.02-0.04% CoO, 0.0005-0.0045% Se, and greater than 0% to at most 1% $TiO_2$, wherein: the amount of redox is from 20% to 30% inclusive; redox, t-$Fe_2O_3$, and $TiO_2$ satisfy a predetermined relationship; and t-$Fe_2O_3$, $Cr_2O_3$, CoO, and Se satisfy a predetermined relationship.

9 Claims, No Drawings

ULTRAVIOLET-ABSORBING GLASS ARTICLE

TECHNICAL FIELD

The present invention relates to an ultraviolet absorbing glass article that is suitable as a dark gray glass for vehicles (particularly for automobiles).

BACKGROUND ART

As a rear-side glass and a rear glass for automobiles, a dark-colored gray glass having a significantly-reduced visible light transmittance (so-called dark gray glass or privacy glass) has been put into practical use. This privacy glass is excellent in indoor comfort and reduction of air-conditioning loads due to a favorable sunlight shielding performance in a wide wavelength region from an ultraviolet region through an infrared region, and is excellent in terms of possible options of a color tone imparting luxury feelings, designability that is excellent from the design viewpoint, in-vehicle privacy protection, and the like.

Patent Document 1 discloses a conventional privacy glass.

Patent Document 1 discloses an infrared absorbing and ultraviolet absorbing glass article which uses components that act as an infrared absorbing material, an ultraviolet-absorbing material and a coloring agent in addition to components of soda-lime silica glass. This glass article is colored green, and has a light transmittance of about 60% or less, a total solar ultraviolet transmittance of about 40% or less, a total solar infrared transmittance of about 45% or less, and a total solar energy transmittance of about 50% or less.

PRIOR ART DOCUMENT

Patent Document

Patent Document 1: JP-T-2003-508338

SUMMARY OF THE INVENTION

Problems that the Invention is to Solve

In recent years, there has been an intensifying interest in ultraviolet countermeasures. In order to cope with this interest, there is a demand for a privacy glass having a lower ultraviolet transmittance (TUV). On the other hand, for safety driving, it is also required to secure rear visibility.

However, although the glass in Patent Document 1 satisfies a low ultraviolet transmittance (TUV), it cannot satisfy the requirement in view of securing visibility since the color is darkened.

In order to solve the above-described problems, an object of the present invention is to provide an ultraviolet absorbing glass article that is easy to manufacture and suitable as a privacy glass for vehicles, has a low ultraviolet transmittance (TUV), and satisfies the requirement for securing visibility.

Means for Solving the Problems

In order to achieve the above-described object, the present invention provides an ultraviolet absorbing glass article containing, in terms of % by mass based on oxides:
$SiO_2$ 66 to 75%,
$Na_2O$ 10 to 20%,
CaO 5 to 15%,
MgO 0 to 6%,
$Al_2O_3$ 0 to 5%,
$K_2O$ 0 to 5%,
total iron (t-$Fe_2O_3$) as represented by $Fe_2O_3$ 0.8% or more and less than 2.4%,
$Cr_2O_3$ 0 to 0.01%,
CoO 0.02 to 0.04%,
Se 0.0005 to 0.0045%, and
$TiO_2$ more than 0% and 1% or less,
satisfying a Redox ([divalent iron ($Fe^{2+}$) in terms of $Fe_2O_3$]/[total of divalent iron ($Fe^{2+}$) in terms of $Fe_2O_3$ and trivalent iron ($Fe^{3+}$) in terms of $Fe_2O_3$], hereinafter, also referred to as "Redox") being 20% or more and 30% or less,
having the Redox, t-$Fe_2O_3$ and $TiO_2$ satisfying the following expression (1),
having the t-$Fe_2O_3$, $Cr_2O_3$, CoO, and Se satisfying the following expression (2),
having an ultraviolet transmittance (TUV) (ISO 9050: 2003) at a sheet thickness of 3.5 mm being 2% or less,
having a visible light transmittance (TVA) (JIS R 3106 (1998)) measured by using a standard illuminant A at a sheet thickness of 3.5 mm being 12% or more and 25% or less,
having a solar radiation transmittance (TE) (JIS R 3106 (1998)) at a sheet thickness of 3.5 mm being 22% or less, and
having an excitation purity (Pe) measured by using a standard illuminant C at a sheet thickness of 3.5 mm being 10% or less:

$$1.77\times(1-\text{Redox}/100)\times(t\text{-}Fe_2O_3)+0.48\times(TiO_2)\geq1.73 \quad (1), \text{ and}$$

$$4\leq(t\text{-}Fe_2O_3)+10\times(Cr_2O_3)+90\times(CoO)+1100\times(Se)\leq8 \quad (2).$$

Advantageous Effect of the Invention

The present invention provides an ultraviolet absorbing glass article that is easy to manufacture and suitable as a privacy glass for vehicles, has a low ultraviolet transmittance (TUV), and satisfies a requirement for securing visibility.

MODE FOR CARRYING OUT THE INVENTION

The ultraviolet absorbing glass article of the present invention contains, in terms of % by mass based on oxides, $SiO_2$: 66 to 75%, $Na_2O$: 10 to 20%, CaO: 5 to 15%, MgO: 0 to 6%, $Al_2O_3$: 0 to 5%, $K_2O$: 0 to 5%, total iron (t-$Fe_2O_3$) as represented by $Fe_2O_3$: 0.8% or more and less than 2.4%, $Cr_2O_3$: 0 to 0.01%, CoO: 0.02 to 0.04%, Se: 0.0005 to 0.0045%, and $TiO_2$: more than 0% and 1% or less, satisfies a Redox ([divalent iron ($Fe^{2+}$) in terms of $Fe_2O_3$]/[total ($Fe^{2+}+Fe^{3+}$) of divalent iron ($Fe^{2+}$) and trivalent iron ($Fe^{3+}$) in terms of $Fe_2O_3$], i.e., [divalent iron ($Fe^{2+}$) in terms of $Fe_2O_3$]/[total ($Fe^{2+}+Fe^{3+}$) of divalent iron ($Fe^{2+}$) in terms of $Fe_2O_3$ and trivalent iron ($Fe^{3+}$) in terms of $Fe_2O_3$], hereinafter, also referred to as "Redox") being 20% or more and 30% or less, has the Redox, t-$Fe_2O_3$ and $TiO_2$ satisfying the following expression (1), has the t-$Fe_2O_3$, $Cr_2O_3$, CoO, and Se satisfying the following expression (2), has an ultraviolet transmittance (TUV) (ISO 9050:2003) at a sheet thickness of 3.5 mm being 2% or less, has a visible light transmittance (TVA) (JIS R 3106 (1998)) measured by using a standard illuminant A at a sheet thickness of 3.5 mm being 12% or more and 25% or less, has a solar radiation transmittance (TE) (JIS R 3106 (1998)) at a sheet thickness of 3.5 mm being 22% or less, and has an excitation purity (Pe) measured by using a standard illuminant C at a sheet thickness of 3.5 mm being 10% or less.

$$1.77 \times (1-\text{Redox}/100) \times (t\text{-Fe}_2\text{O}_3) + 0.48 \times (\text{TiO}_2) \geq 1.73 \quad (1)$$

$$4 \leq (t\text{-Fe}_2\text{O}_3) + 10 \times (\text{Cr}_2\text{O}_3) + 90 \times (\text{CoO}) + 1100 \times (\text{Se}) \leq 8 \quad (2)$$

The above-described numerical ranges expressed by using "to" is used to mean that numerical values described before and after the "to" are included as the lower limit value and the upper limit value, and, hereinafter in the present specification, unless particularly otherwise described, "to" will be used in the same manner.

The reasons for the present invention containing the above-described components will be described below. Unless particularly otherwise described, "%" indicates % by mass.

$SiO_2$ is a component that forms networks, and is an essential component. In the case where the content of $SiO_2$ is 66% or more, weathering resistance becomes favorable. The content is preferably 67% or more and more preferably 68% or more. On the other hand, in the case where the content is 75% or less, viscosity does not become too high and this is favorable for a melting of raw materials. The content is preferably 72% or less and more preferably 70% or less.

$Na_2O$ is a component that accelerates the melting of raw materials, and is an essential component. In the case where the content of $Na_2O$ is 10% or more, the melting of raw materials is accelerated. The content is preferably 11% or more and more preferably 12% or more. On the other hand, in the case where the content is 20% or less, weathering resistance does not become poor. The content is preferably 18% or less and more preferably 16% or less.

CaO is a component that accelerates the melting of raw materials and improves weathering resistance, and is an essential component. In the case where the content of CaO is 5% or more, the melting of raw materials is accelerated and weathering resistance is improved. The content is preferably 6% or more and more preferably 7% or more. On the other hand, in the case where the content is 15% or less, devitrification is suppressed. The content is preferably 13% or less and more preferably 11% or less.

MgO is a component that accelerates the melting of raw materials and improves weathering resistance, and is an optional component. In the case where the content of MgO is 6% or less, devitrification is suppressed. The content is preferably 5% or less and more preferably 4% or less.

$Al_2O_3$ is a component that improves weathering resistance, and is an optional component. In the case where the content of $Al_2O_3$ is 5% or less, viscosity does not become too high and this is favorable for the melting of raw materials. The content is preferably 4% or less and more preferably 3% or less.

$K_2O$ is a component that accelerates the melting of raw materials, and is an optional component. In the case where the content of $K_2O$ is 5% or less, damage on refractories of melting furnace due to volatilization is suppressed. The content is preferably 4% or less and more preferably 3% or less.

In the case where the content of the total iron (t-$Fe_2O_3$) in terms of $Fe_2O_3$ is 0.8% or more, the visible light transmittance (TVA) is not made large, and in the case where the content is less than 2.4%, the visible light transmittance (TVA) is not made small. That is, the visible light transmittance (TVA) falls within an appropriate range. More preferable content of the total iron is 1.0% or more, and is 1.8% or less.

In the ultraviolet absorbing glass article of the present invention, as an index of a balance between the visible light transmittance (TVA) and the solar radiation transmittance (TE), Redox ([divalent iron ($Fe^{2+}$) in terms of $Fe_2O_3$]/[total ($Fe^{2+}$+$Fe^{3+}$) of divalent iron ($Fe^{2+}$) in terms of $Fe_2O_3$ and trivalent iron ($Fe^{2+}$) in terms of $Fe_2O_3$] is used. Since the ultraviolet absorbing glass article of the present invention has Redox of 20% or more, the solar radiation transmittance (TE) does not become too large. On the other hand, since Redox is 30% or less, the visible light transmittance (TVA) does not become too small. The ultraviolet absorbing glass article of the present invention has Redox of preferably 21% or more, more preferably 22% or more. In addition, Redox is preferably 29% or less, more preferably 28% or less, still more preferably 27% or less, and particularly preferably 26% or less.

$Cr_2O_3$ is a component that lowers the visible light transmittance (TVA) without increasing the excitation purity (Pe) so much, and is an optional component. In the case where the content of $Cr_2O_3$ is 0.01% or less, an increase in the excitation purity (Pe) is suppressed. The content is preferably 0.009% or less and more preferably 0.008% or less.

CoO is a component that tints glass bluish and also decreases the excitation purity (Pe) to 10% or less, and is an essential component. In the case where the content of CoO is 0.02% or more, a tone of glass is suppressed from appearing yellowish. The content is preferably 0.022% or more, more preferably 0.024% or more, and still more preferably 0.025% or more. In the case where the content is 0.04% or less, the tone of glass does not make the visible light transmittance (TVA) too low. The content is preferably 0.038% or less, more preferably 0.036% or less, and still more preferably 0.030% or less.

Se is a component that tints glass reddish and also decreases the excitation purity (Pe) to 10% or less, and is an essential component. In the case where the content is 0.0005% or more, a tone of glass is suppressed from appearing bluish. The content is preferably 0.0007% or more and more preferably 0.0010% or more. In the case where the content is 0.0045% or less, the tone of glass is suppressed from appearing yellowish. The content is preferably 0.0037% or less, more preferably 0.0034% or less, and still more preferably 0.0020% or less.

$TiO_2$ is a component that decreases the ultraviolet transmittance (TUV), and is an essential component. In addition, $TiO_2$ has an effect of decreasing viscosity of molten glass during melting and an action of making the molten glass difficult to stagnate. In the case where the content of $TiO_2$ is more than 0%, the ultraviolet transmittance (TUV) is not made large.

The content is preferably 0.1% or more and more preferably 0.2% or more. In the case where the content is 1% or less, a yellowish tint is suppressed and an increase in the excitation purity (Pe) is suppressed. The content is preferably 0.98% or less, more preferably 0.95% or less, and still more preferably 0.9% or less.

In the present invention, as mentioned above, Redox, t-$Fe_2O_3$ and $TiO_2$ can maintain a balance between the visible light transmittance (TVA) and the solar radiation transmittance (TE), control the visible light transmittance (TVA) to a suitable range, suppress the ultraviolet transmittance (TUV), suppress a yellowish tint, and suppress an increase in the excitation purity (Pe), depending on the component amounts and conditions.

In the ultraviolet absorbing glass article of the present invention, since Redox, t-$Fe_2O_3$ and $TiO_2$ satisfy the following expression (1), it becomes possible to lower the ultraviolet transmittance (TUV) easily.

$$1.77 \times (1-\text{Redox}/100) \times (t\text{-Fe}_2\text{O}_3) + 0.48 \times (\text{TiO}_2) \geq 1.73 \quad (1)$$

In the ultraviolet absorbing glass article of the present invention, Redox, t-Fe$_2$O$_3$ and TiO$_2$ preferably satisfy the following expression (3) and more preferably satisfy the following expression (4).

$$1.77 \times (1-\text{Redox}/100) \times (t\text{-Fe}_2\text{O}_3) + 0.48 \times (\text{TiO}_2) \geq 1.83 \quad (3)$$

$$1.77 \times (1-\text{Redox}/100) \times (t\text{-Fe}_2\text{O}_3) + 0.48 \times (\text{TiO}_2) \geq 2.03 \quad (4)$$

On the other hand, in the ultraviolet absorbing glass article of the present invention, Redox, t-Fe$_2$O$_3$ and TiO$_2$ preferably satisfy the following expression (5), in order not to decrease the visible light transmittance (TVA).

$$1.77 \times (1-\text{Redox}/100) \times (t\text{-Fe}_2\text{O}_3) + 0.48 \times (\text{TiO}_2) \leq 3.83 \quad (5)$$

On the other hand, in the ultraviolet absorbing glass article of the present invention, Redox, t-Fe$_2$O$_3$ and TiO$_2$ preferably satisfy the following expression (6) and more preferably satisfy the following expression (7).

$$1.77 \times (1-\text{Redox}/100) \times (t\text{-Fe}_2\text{O}_3) + 0.48 \times (\text{TiO}_2) \leq 3.53 \quad (6)$$

$$1.77 \times (1-\text{Redox}/100) \times (t\text{-Fe}_2\text{O}_3) + 0.48 \times (\text{TiO}_2) \leq 3.23 \quad (7)$$

In the present invention, as mentioned above, t-Fe$_2$O$_3$, Cr$_2$O$_3$, CoO, and Se can control the visible light transmittance (TVA) to within a suitable range, lower the visible light transmittance (TVA) without increasing the excitation purity (Pe), and suitably control a tone by the amounts of the components.

In the ultraviolet absorbing glass article of the present invention, since t-Fe$_2$O$_3$, Cr$_2$O$_3$, CoO, and Se satisfy the following expression (2), Pe can be easily decreased and also the ultraviolet transmittance (TUV) can be decreased to 2% or less and the visible light transmittance (TVA) can be set within a range of 12% or more and 25% or less, to thereby form a dark gray glass.

$$4 \leq (t\text{-Fe}_2\text{O}_3) + 10 \times (\text{Cr}_2\text{O}_3) + 90 \times (\text{CoO}) + 1100 \times (\text{Se}) \leq 8 \quad (2)$$

In the ultraviolet absorbing glass article of the present invention, t-Fe$_2$O$_3$, Cr$_2$O$_3$, CoO, and Se preferably satisfy the following expression (8), more preferably satisfy the following expression (9), still more preferably satisfy the following expression (10), particularly preferably satisfy the following expression (11), and most preferably satisfy the following expression (12).

$$4.3 \leq (t\text{-Fe}_2\text{O}_3) + 10 \times (\text{Cr}_2\text{O}_3) + 90 \times (\text{CoO}) + 1100 \times (\text{Se}) \leq 7.7 \quad (8)$$

$$4.5 \leq (t\text{-Fe}_2\text{O}_3) + 10 \times (\text{Cr}_2\text{O}_3) + 90 \times (\text{CoO}) + 1100 \times (\text{Se}) \leq 7.5 \quad (9)$$

$$5.0 \leq (t\text{-Fe}_2\text{O}_3) + 10 \times (\text{Cr}_2\text{O}_3) + 90 \times (\text{CoO}) + 1100 \times (\text{Se}) \leq 7.5 \quad (10)$$

$$5.0 \leq (t\text{-Fe}_2\text{O}_3) + 10 \times (\text{Cr}_2\text{O}_3) + 90 \times (\text{CoO}) + 1100 \times (\text{Se}) \leq 7.0 \quad (11)$$

$$5.3 \leq (t\text{-Fe}_2\text{O}_3) + 10 \times (\text{Cr}_2\text{O}_3) + 90 \times (\text{CoO}) + 1100 \times (\text{Se}) \leq 7.0 \quad (12)$$

In actual production, since a refining agent such as salt cake may be used, as a vestige thereof, 0.05% to 1.0% of SO$_3$ usually remains in the ultraviolet absorbing glass article of the present invention.

The ultraviolet absorbing glass article of the present invention may contain an oxide of Ni as an optional component, in addition to the above-described components. In this case, by adding Ni in an amount of 0.05% or less in terms of the oxide (NiO) relative to the total amount of the components of the above-described glass matrix composition, the glass article can be tinted brownish and the solar radiation transmittance (TE) can be decreased. The content of the oxide of Ni is preferably 0.04% or less and more preferably 0.03% or less in terms of the oxide (NiO).

The ultraviolet absorbing glass article of the present invention may contain, in addition to the above-described components, any of the oxides of B, Ba, Sr, Li, Zn, Pb, P, Zr, and Bi. The contents of them in terms of the oxides (B$_2$O$_3$, BaO, SrO, Li$_2$O, ZnO, PbO, P$_2$O$_5$, ZrO$_2$, Bi$_2$O$_3$) may be each 0 to 1% relative to the total amount of the components of the above-described glass matrix composition. The total amount of the above described each oxides is preferably 2% or less, more preferably 0.7% or less, still more preferably 0.4% or less, particularly preferably 0.2% or less, and most preferably 0.1% or less.

The ultraviolet absorbing glass article of the present invention may contain Sb, As, Cl, and F. These elements can be intentionally mixed into glass from a melting accelerator or a refining agent. Alternatively, these elements may be contained as impurities in raw materials or cullet. The contents of these elements may be 0 to 0.1%, may be 0 to 0.05%, and may be 0 to 0.01% relative to the total amount of the components of the above-described glass matrix composition.

The ultraviolet absorbing glass article of the present invention may contain an oxide of Sn. Sn comes into contact with glass at the time of forming in a float process to enter into the glass. The content thereof in terms of the oxide (SnO$_2$) may be 0 to 0.1% relative to the total amount of the components of the above-described glass matrix composition.

The ultraviolet absorbing glass article of the present invention may contain any of the oxides of Mn, Cu, Mo, Nd, and Er. The contents of them in terms of the oxides (MnO$_2$, CuO, MoO$_3$, Nd$_2$O$_3$, Er$_2$O$_3$) may be 0 to 0.1%, may be 0 to 0.05%, and may be 0 to 0.01%.

In addition, the ultraviolet absorbing glass article of the present invention may contain CeO$_2$ for decreasing the ultraviolet transmittance (TUV). In the case of containing CeO$_2$, the content of CeO$_2$ may be 0 to 1%. CeO$_2$ may be contained in a ratio of preferably 0.7% or less, more preferably 0.4% or less, still more preferably 0.2% or less, and particularly preferably 0.1% or less. In order to reduce raw material costs, CeO$_2$ is preferably not substantially contained. Here, the phrase "not substantially contained" means that it is not contained except for inevitable impurities and, in the present invention, specifically means that the content of CeO$_2$ is 100 ppm or less in the glass.

In addition, V$_2$O$_5$ is preferably not substantially contained in the ultraviolet absorbing glass of the present invention since the solar radiation transmittance (TE) becomes low. Here, the phrase "not substantially contained" means that it is not contained except for inevitable impurities and, in the present invention, specifically means that the content of V$_2$O$_5$ is 100 ppm or less in the glass.

Incidentally, WO$_3$ is preferably not substantially contained in the ultraviolet absorbing glass article of the present invention. Here, the phrase "not substantially contained" means that it is not intentionally contained except for inevitable impurities, and specifically means that the content of WO$_3$ is 100 ppm or less in the glass.

In the case where the ultraviolet absorbing glass article of the present invention is used for vehicles, particularly, as privacy glass for vehicles, the article is a glass sheet which has the above-described composition and has optical characteristics as described below.

The ultraviolet transmittance (TUV) is 2% or less and preferably 1% or less at a thickness of 3.5 mm.

The visible light transmittance (TVA) is 12% or more, preferably 13% or more, and more preferably 14% or more at a thickness of 3.5 mm. On the other hand, the visible light transmittance (TVA) is 25% or less, preferably 24% or less, and more preferably 23% or less at a thickness of 3.5 mm.

The solar radiation transmittance (TE) is 22% or less, preferably 20% or less, and more preferably 19% or less at a thickness of 3.5 mm.

In addition to the above-described optical characteristics, the ultraviolet transmittance (TUV400) is preferably 5% or less, more preferably 3% or less, and still more preferably 2% or less at a thickness of 3.5 mm.

In addition to the above-described optical characteristics, the excitation purity (Pe) is 10% or less and preferably 7% or less at a thickness of 3.5 mm.

In addition to the above-described optical characteristics, a dominant wavelength λD is preferably 485 to 580 nm at a thickness of 3.5 mm.

Through the present description, the solar radiation transmittance (TE) and the visible light transmittance (TVA) are determined in accordance with JIS-R3106 (1998), and the ultraviolet transmittance (TUV) and the ultraviolet transmittance (TUV400) are determined in accordance with ISO 9050 (2003) and ISO 13837:2008 convention A, respectively. Furthermore, the visible light transmittance (TVA) is calculated by employing a standard illuminant A two-degree visual field, and the dominant wavelength λD and the excitation purity (Pe) are calculated by employing a standard illuminant C two-degree visual field each.

In addition, in the case where the temperature at which a viscosity reaches 100 poise is 1,440° C. or lower, the ultraviolet absorbing glass article of the present invention has an advantage of facilitating the glass manufacturing. The temperature at which the viscosity reaches 100 poise is preferably 1,435° C. or lower, more preferably 1,410° C. or lower, and particularly preferably 1,400° C. or lower.

The method for manufacturing the ultraviolet absorbing glass article of the present invention is not particularly limited, but it can be manufactured, for example, as described below. Blended raw materials are continuously supplied to a melting furnace and are heated at approximately 1,500° C. by using heavy oil or the like to perform vitrification. Next, this molten glass is refined and then formed into a sheet-shaped glass ribbon having a predetermined thickness by using a float method or the like. Then, this glass ribbon is cut into a predetermined shape, thereby manufacturing the ultraviolet absorbing glass article of the present invention. Thereafter, as necessary, the cut glass can be subjected to a strengthening treatment, can be processed into laminated glass, or can be processed into multilayered glass.

EXAMPLES

Examples 1 to 16

In the following, Examples 1 to 10 are Invention Examples, and Examples 11 to 16 are Comparative Examples. A raw material batch was prepared by using silica sand, feldspar, dolomite, soda ash, salt cake, blast furnace slag, ferric oxide, titanium oxide, cobalt oxide, sodium selenite, chromium oxide, and the like, as raw materials. As a basic component of glass, soda-lime silicate glass made up of, $SiO_2$: 65 to 70, $Na_2O$: 13.3, CaO: 8.4, MgO: 4.6, $Al_2O_3$: 1.8, $K_2O$: 0.7, and $SO_3$: 0.2 (unit: % by mass) was used. The content of $SiO_2$ was adjusted so that the total of the basic component and $t\text{-}Fe_2O_3$ (total iron represented by $Fe_2O_3$), $Cr_2O_3$, CoO, Se, $V_2O_5$, and $TiO_2$, which were added thereto as absorption components, reached 100% by mass, thereby producing the target composition. The batch was put into a platinum-rhodium-made crucible and melted in an electric furnace in an atmosphere with an $O_2$ concentration of approximately 0.5%. The molten glass was flowed out on a carbon sheet, and then annealed in another electric furnace. The obtained glass block was cut into some pieces, some of them was polished, and the composition thereof was analyzed by using a fluorescent X-ray analyzer. A surface of other pieces was polished into a mirrored surface and finished to have a thickness of 3.5 mm, and a spectral transmittance was measured by a spectral photometer. In addition, the ultraviolet transmittances (TUV and TUV400), visible light transmittance (TVA), solar radiation transmittance (TE), dominant wavelength λD, and excitation purity (Pe) were computed on the basis of the spectral transmittance. The contents of absorption components in the obtained glass in Examples 1 to 16 and optical characteristics are shown below.

TABLE 1

|  |  |  | Ex. 1 | Ex. 2 | Ex. 3 | Ex. 4 | Ex. 5 |
|---|---|---|---|---|---|---|---|
| Composition | /% by mass | $t\text{-}Fe_2O_3$ | 1.04 | 1.20 | 1.66 | 1.81 | 1.98 |
|  | /% | Redox | 29 | 25 | 22 | 21 | 25 |
|  | /% by mass | $TiO_2$ | 0.95 | 0.90 | 0.50 | 0.86 | 0.80 |
|  | /% by mass | CoO | 0.0264 | 0.0250 | 0.0300 | 0.0278 | 0.0250 |
|  | /% by mass | $Cr_2O_3$ | 0.0022 | 0.0050 | 0.0088 | 0.0011 | 0.0020 |
|  | /% by mass | Se | 0.0025 | 0.0018 | 0.0020 | 0.0015 | 0.0013 |
|  | /% by mass | $V_2O_5$ | 0.00 | 0.00 | 0.00 | 0.00 | 0.00 |
|  |  | Expression (1) | 1.76 | 2.03 | 2.53 | 2.94 | 3.01 |
|  |  | Expression (2) | 6.2 | 5.5 | 6.6 | 6.0 | 5.7 |
| Optical characteristics (sheet thickness of 3.5 mm) | /% | TVA | 15.4 | 16.8 | 12.2 | 15.4 | 15.9 |
|  | /% | TE | 17.7 | 18.1 | 12.8 | 14.0 | 15.4 |
|  | /% | TUV | 1.9 | 1.9 | 1.2 | 1.0 | 1.0 |
|  | /% | TUV400 | 3.2 | 3.2 | 3.1 | 2.9 | 2.9 |
|  | /nm | λD | 590.8 | 491.0 | 524.8 | 541.1 | 544.5 |
|  | /% | Pe | 3.9 | 1.5 | 1.6 | 3.3 | 6.3 |

TABLE 2

|  |  |  | Ex. 6 | Ex. 7 | Ex. 8 | Ex. 9 | Ex. 10 |
|---|---|---|---|---|---|---|---|
| Composition | /% by mass | t-Fe$_2$O$_3$ | 2.18 | 1.02 | 1.06 | 2.38 | 0.99 |
|  | /% | Redox | 26 | 27 | 29 | 21 | 21 |
|  | /% by mass | TiO$_2$ | 0.21 | 0.92 | 0.92 | 0.98 | 0.76 |
|  | /% by mass | CoO | 0.0293 | 0.0305 | 0.0352 | 0.0282 | 0.0297 |
|  | /% by mass | Cr$_2$O$_3$ | 0.0011 | 0.0012 | 0.0012 | 0.003 | 0.0081 |
|  | /% by mass | Se | 0.0015 | 0.0033 | 0.0025 | 0.0007 | 0.0025 |
|  | /% by mass | V$_2$O$_5$ | 0.00 | 0.00 | 0.00 | 0.00 | 0.40 |
|  |  | Expression (1) | 2.96 | 1.76 | 1.77 | 3.80 | 1.75 |
|  |  | Expression (2) | 6.5 | 7.4 | 7.0 | 5.7 | 6.5 |
| Optical characteristics (sheet thickness of 3.5 mm) | /% | TVA | 13.3 | 12.1 | 12.1 | 15.0 | 15.3 |
|  | /% | TE | 11.7 | 17.8 | 16.7 | 16.4 | 24.8 |
|  | /% | TUV | 0.9 | 1.6 | 1.8 | 0.3 | 1.3 |
|  | /% | TUV400 | 2.7 | 3.3 | 3.3 | 1.3 | 3.2 |
|  | /nm | λD | 521.3 | 593.3 | 468.6 | 516.5 | 515.8 |
|  | /% | Pe | 4.2 | 9.4 | 4.7 | 5.5 | 1.6 |

TABLE 3

|  |  |  | Ex. 11 | Ex. 12 | Ex. 13 | Ex. 14 | Ex. 15 | Ex. 16 |
|---|---|---|---|---|---|---|---|---|
| Composition | /% by mass | t-Fe$_2$O$_3$ | 2.75 | 1 | 1.8 | 1.8 | 1.2 | 1 |
|  | /% | Redox | 27.8 | 23.9 | 25 | 25 | 20 | 25 |
|  | /% by mass | TiO$_2$ | 0.20 | 0.07 | 0.90 | 0.90 | 0.90 | 0.90 |
|  | /% by mass | CoO | 0.0220 | 0.0237 | 0.0205 | 0.0180 | 0.0205 | 0.0360 |
|  | /% by mass | Cr$_2$O$_3$ | 0.0250 | 0.0060 | 0.0050 | 0.0050 | 0.0010 | 0.0092 |
|  | /% by mass | Se | 0.0027 | 0.0029 | 0.0000 | 0.0018 | 0.0005 | 0.0036 |
|  | /% by mass | V$_2$O$_5$ | 0.00 | 0.00 | 0.00 | 0.00 | 0.00 | 0.00 |
|  |  | Expression (1) | 3.61 | 1.38 | 2.82 | 2.82 | 2.13 | 1.76 |
|  |  | Expression (2) | 8.0 | 6.4 | 3.7 | 5.5 | 3.6 | 8.3 |
| Optical characteristics (sheet thickness of 3.5 mm) | /% | TVA | 14.2 | 21.9 | 21.0 | 17.4 | 22.9 | 7.7 |
|  | /% | TE | 9.8 | 25.2 | 12.3 | 10.4 | 23.9 | 16.9 |
|  | /% | TUV | 3.4 | 5.8 | 1.6 | 1.1 | 2.2 | 1.5 |
|  | /% | TUV400 | 8.7 | 14.5 | 3.3 | 3.0 | 2.9 | 3.3 |
|  | /nm | λD | 550.0 | 485.0 | 492.4 | 570.4 | 483.6 | 603.5 |
|  | /% | Pe | 11.7 | 2.3 | 13.2 | 17.6 | 12.6 | 6.2 |

Each glass of Invention Examples (Examples 1 to 10), which satisfied all of the conditions regarding the glass composition, satisfied the conditions regarding the optical characteristics at a sheet thickness of 3.5 mm. However, in Example 10 where V$_2$O$_5$ was contained, a larger solar radiation transmittance (TE) was shown as compared with the other Invention Examples (Examples 1 to 9). In Example 11 where the content of Cr$_2$O$_3$ was more than 0.01%, the excitation purity (Pe) at a sheet thickness of 3.5 mm was more than 10%. In Example 12 where the value of the expression (1) was less than 1.73, the ultraviolet transmittance (TUV) at a sheet thickness of 3.5 mm was more than 2%. In Example 13 where Se was not contained, the excitation purity (Pe) at a sheet thickness of 3.5 mm was more than 10%. In Example 14 where the content of CoO was less than 0.02%, the excitation purity (Pe) at a sheet thickness of 3.5 mm was more than 10%. In Example 15 where the value of the expression (2) was less than 4, the ultraviolet transmittance (TUV) at a sheet thickness of 3.5 mm was more than 2%. In Example 16 where the value of the expression (2) was more than 8, the visible light transmittance (TVA) at a sheet thickness of 3.5 mm was less than 12%.

Although the present invention has been described in detail and by reference to the specific embodiments, it is apparent to one skilled in the art that various modifications or changes can be made without departing the spirit and scope of the present invention. This application is based on Japanese Patent Application (No. 2015-204306) filed on Oct. 16, 2015, the disclosure of which is incorporated herein by reference.

INDUSTRIAL APPLICABILITY

According to the present invention, there can be provided an ultraviolet absorbing glass article which is easy to manufacture and suitable as a privacy glass for vehicles, has a low ultraviolet transmittance (TUV), and satisfies a requirement for securing visibility. The article is particularly useful as a glass sheet for rear-side glass windows and rear glass windows for automobiles.

The invention claimed is:
1. An ultraviolet absorbing glass article comprising, in terms of % by mass based on oxides:
SiO$_2$ 66 to 75%,
Na$_2$O 10 to 20%,
CaO 5 to 15%,
MgO 0 to 6%,
Al$_2$O$_3$ 0 to 5%,
K$_2$O 0 to 5%,
total iron (t-Fe$_2$O$_3$) as represented by Fe$_2$O$_3$ 0.8% or more and less than 2.4%,
Cr$_2$O$_3$ 0 to 0.01%,
CoO 0.02 to 0.04%,
Se 0.0005 to 0.0045%, and
TiO$_2$ more than 0% and 1% or less,
a Redox, which is (an content of divalent iron (Fe$^{2+}$) in terms of Fe$_2$O$_3$)/(a total content of divalent iron (Fe$^{2+}$)

in terms of $Fe_2O_3$ and trivalent iron ($Fe^{2+}$) in terms of $Fe_2O_3$), being 20% or more and 30% or less, the Redox, and the contents of t-$Fe_2O_3$ and $TiO_2$ satisfying expression (1), the contents of t-$Fe_2O_3$, $Cr_2O_3$, CoO, and Se satisfying expression (2), the ultraviolet absorbing glass article having:

an ultraviolet transmittance (TUV) (ISO 9050:2003) at a sheet thickness of 3.5 mm being 2% or less, a visible light transmittance (TVA) (JIS R 3106 (1998)) measured by using a standard illuminant A at a sheet thickness of 3.5 mm being 12% or more and 25% or less, a solar radiation transmittance (TE) (JIS R 3106 (1998)) at a sheet thickness of 3.5 mm being 22% or less, and an excitation purity (Pe) measured by using a standard illuminant C at a sheet thickness of 3.5 mm being 10% or less:

$$1.77 \times (1-\text{Redox}/100) \times (t\text{-}Fe_2O_3) + 0.48 \times (TiO_2) \geq 1.73 \quad (1),\text{ and}$$

$$5.0 \leq (t\text{-}Fe_2O_3) + 10 \times (Cr_2O_3) + 90 \times (CoO) + 1100 \times (Se) \leq 8 \quad (2).$$

2. The ultraviolet absorbing glass article according to claim 1, wherein the content of $TiO_2$ is 0.1% or more and 1% or less.

3. The ultraviolet absorbing glass article according to claim 1, wherein the content of $Cr_2O_3$ is 0% or more and 0.008% or less.

4. The ultraviolet absorbing glass article according to claim 1, wherein the contents of t-$Fe_2O_3$, $Cr_2O_3$, CoO, and Se satisfies expression (2-1):

$$5.0 \leq (t\text{-}Fe_2O_3) + 10 \times (Cr_2O_3) + 90 \times (CoO) + 1100 \times (Se) \leq 7.5 \quad (2\text{-}1).$$

5. The ultraviolet absorbing glass article according to claim 1, wherein a content of NiO is 0 to 0.05% by mass relative to a total amount of components of the glass composition.

6. The ultraviolet absorbing glass article according to claim 1, wherein the ultraviolet absorbing glass comprises substantially no $V_2O_5$.

7. The ultraviolet absorbing glass article according to claim 1, wherein the Redox is 20% or more and 27% or less.

8. The ultraviolet absorbing glass article according to claim 1, wherein the Redox is 20% or more and 26% or less.

9. The ultraviolet absorbing glass article according to claim 1, having an ultraviolet transmittance (TUV400) specified by ISO 13837:2008 convention A at a sheet thickness of 3.5 mm being 5% or less.

* * * * *